United States Patent

Higashimura et al.

[11] Patent Number: 5,921,638
[45] Date of Patent: Jul. 13, 1999

[54] BRAKE FLUID PRESSURE CONTROL DEVICE

[75] Inventors: Hideaki Higashimura; Takato Ohgaki; Youichi Miyawaki; Koichi Hashida; Takamitu Ishihara, all of Itami, Japan

[73] Assignee: Sumitomo Electric Industries, Ltd., Osaka, Japan

[21] Appl. No.: 08/828,718

[22] Filed: Mar. 28, 1997

[30] Foreign Application Priority Data

Mar. 29, 1996 [JP] Japan .................................. 8-075763
Dec. 6, 1996 [JP] Japan .................................. 8-326656

[51] Int. Cl.$^6$ .................................................. B60T 8/40
[52] U.S. Cl. ................................ 303/116.1; 303/113.2; 303/116.2
[58] Field of Search ........................... 303/116.1, 116.2, 303/113.2

[56] References Cited

U.S. PATENT DOCUMENTS

| | | | |
|---|---|---|---|
| 5,039,175 | 8/1991 | Holzmann et al. | 303/116.1 |
| 5,374,112 | 12/1994 | Takata et al. | 303/113.2 |
| 5,405,191 | 4/1995 | Nishiyama et al. | 303/116.1 |
| 5,437,501 | 8/1995 | Kohno et al. | 303/116.2 |
| 5,538,334 | 7/1996 | Kushi et al. | 303/116.1 |
| 5,584,539 | 12/1996 | Hashida | 303/116.2 |
| 5,707,116 | 1/1998 | Tsuru et al. | 303/116.2 |

*Primary Examiner*—Robert J. Oberleitner
*Assistant Examiner*—Robert A. Siconolfi
*Attorney, Agent, or Firm*—Wenderoth, Lind & Ponack, L.L.P.

[57] ABSTRACT

A brake fluid pressure control device which is simple in structure and inexpensive, which has the functions as both an antilock controller and a traction controller, and which is capable of automatically increasing braking pressure with pumps while the driver is treading the brake pedal. Shutoff valves serving as fluid sources for pumps are provided in a fluid circulation type antilock control device. When the brake pedal is treaden, the shutoff valves close under the master cylinder pressure. While the shutoff valves are closed, no fluid can be supplied to the pump. But in this state, changeover valves open, so that fluid can be supplied from the master cylinder to the pumps through the changeover valves. Check valves are further provided to prevent the fluid supplied to the pumps from flowing into dumped fluid reservoirs.

4 Claims, 8 Drawing Sheets

Figure 3:
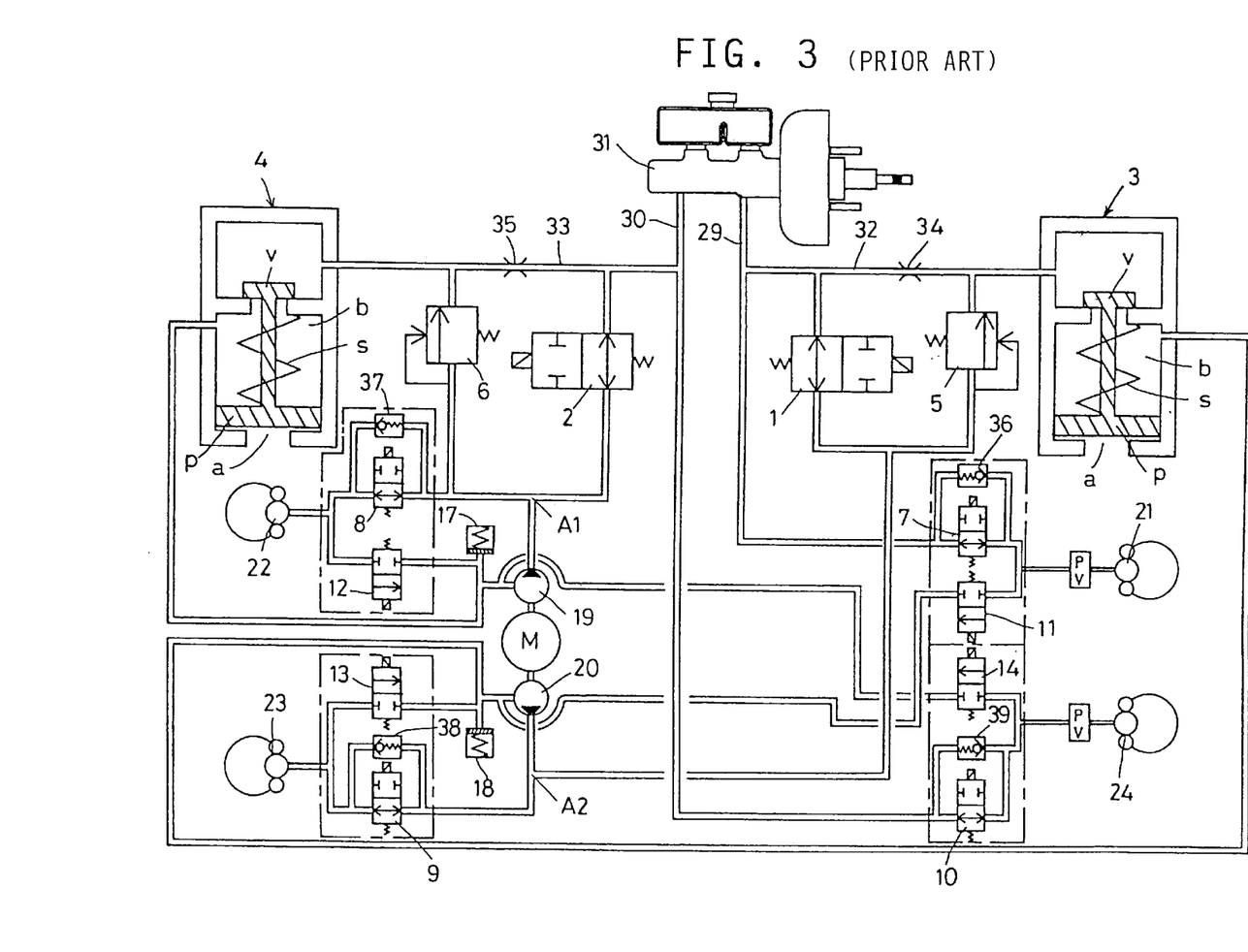
FIG. 3 is a circuit diagram of a prior art brake fluid pressure control device which the applicant of this invention proposed before.

FIG. 8 ns and 21 and 24 are non-driving rear wheel brakes); pressure control valves (consisting of on-off valve 7–10 for opening and closing the main fluid lines, and on-off valves 11–14 for opening and closing discharge lines) in the main lines 29, 30, dumped fluid reservoirs 17, 18 for temporarily storing brake fluid dumped from the wheel brakes through the on-off valves 11, 13 and 12, 14; pumps 19, 20 for pumping brake fluid in the dumped fluid reservoirs into the main fluid lines; fluid supply lines 32, 33 branching from the main fluid lines 29, 30 at points between the master cylinder and the fluid return points A1, A2 at which brake fluid from the pump is returned to the main fluid lines and leading to the dumped fluid reservoirs 17, 18; first changeover valves 1, 2 for checking fluid flow from the brake fluid return points A1, A2 toward the master cylinder 31 during traction control; relief valves 5, 6 for releasing excess pump dumped fluid into the main fluid lines while the first changeover valves 1, 2 are closed; and shutoff valves 3, 4 for checking fluid flow through the fluid supply lines 32, 33 toward the dumped fluid reservoirs 17, 18 while the master cylinder is being pressurized.

BRAKE FLUID PRESSURE CONTROL DEVICE

BACKGROUND OF THE INVENTION

The present invention relates to a simple, high-performance brake fluid pressure control device mounted on an automobile for carrying out antilock brake control, traction control and automatic braking for controlling the stability of running vehicles.

Of various conventional antilock brake systems (ABS), what is known as fluid circulation type ABS's are relatively inexpensive and thus most widely used. An ABS of this type comprises on-off valves provided in each main fluid line connecting the master cylinder to the vehicle wheel brakes at positions near the respective wheels, a dumped fluid reservoir for temporarily storing brake fluid dumped from the wheel brakes, an on-off valve provided in a fluid line leading from the wheel brakes to the dumped fluid reservoir, and a pump for returning brake fluid in the dumped reservoir chamber back into the main fluid line. Brake fluid dumped from the wheel brake being pressure-reduced for antilock control is temporarily stored in the dumped fluid reservoir and returned by the pump into the main fluid line to repressurize the fluid in the wheel brake cylinder during antilock braking control.

If the fluid circulation pump of this device is used as a pressure source for traction control (herein after called T/C control), it is possible to control the vehicle behavior in a highly sophisticated and economical manner. For this purpose, unexamined Japanese patent publication 64-74153 proposes to add on-off valves to a fluid circulation type antilock device. The on-off valves connect the fluid supply lines to the main fluid lines during T/C control, and otherwise disconnect them. This arrangement has a problem in that the pump suction resistance is large because fluid is supplied from the master cylinder reservoir through a pipe line to the pumps during T/C control. The pumps thus can not dump brake fluid sufficiently quickly, which will impair responsiveness of the braking system.

Unexamined Japanese patent publication 6-72301 proposes to provide second reservoirs besides the dumped fluid reservoirs in order to more smoothly supply fluid to the pumps. But in this arrangement, if the pumps are activated while the fluid pressure produced in the master cylinder (hereinafter master cylinder pressure) is zero, the pistons in the second reservoirs will move, making it impossible to supply fluid during T/C control. Also, while the master cylinder pressure is being produced, the pistons for restricting the movement of the second reservoirs will go forward and back every time the brake pedal is depressed, thus extending the pedal stroke.

Unexamined Japanese patent publication 4-231241 proposes to use the active pressure accumulators with driving units as the second reservoirs. In this arrangement, there will be no unexpected behavior of the accumulators and the driving units make it possible to efficiently supply brake fluid to the pumps. But the accumulators and the driving units will increase the cost of the entire system.

The applicant of this invention proposed a brake fluid pressure control device that is free of all of the abovementioned problems and the problems of unexamined Japanese patent publication 5-116607, in unexamined Japanese patent publication 6-246400.

This device, shown in FIG. 3, comprises two main fluid lines 29 and 30 connecting a master cylinder 31 to wheel brakes 21–24 (of which 22 and 23 are driving front wheel brakes and 21 and 24 are non-driving rear wheel brakes); pressure control valves (consisting of on-off valve 7–10 for opening and closing the main fluid lines, and on-off valves 11–14 for opening and closing discharge lines) in the main lines 29, 30, dumped fluid reservoirs 17, 18 for temporarily storing brake fluid dumped from the wheel brakes through the on-off valves 11, 13 and 12, 14; pumps 19, 20 for pumping brake fluid in the dumped fluid reservoirs into the main fluid lines; fluid supply lines 32, 33 branching from the main fluid lines 29, 30 at points between the master cylinder and the fluid return points A1, A2 at which brake fluid from the pump is returned to the main fluid lines and leading to the dumped fluid reservoirs 17, 18; first changeover valves 1, 2 for checking fluid flow from the brake fluid return points A1, A2 toward the master cylinder 31 during traction control; relief valves 5, 6 for releasing excess pump dumped fluid into the main fluid lines while the first changeover valves 1, 2 are closed; and shutoff valves 3, 4 for checking fluid flow through the fluid supply lines 32, 33 toward the dumped fluid reservoirs 17, 18 while the master cylinder is being pressurized.

The improvement of this device lies in that each of the shutoff valves 3, 4 comprises an atmospheric chamber a, a fluid chamber b communicating with the dumped fluid chamber 18 (or 17), a piston p partitioning the chambers a and b, and a valve body v movable together with the piston p for shutting off the supply line 32 (or 33) from the dumped fluid reservoir 18 (or 17) when the piston p has moved toward the atmospheric chamber to its lower stroke end and otherwise permitting fluid communication therebetween. When the piston p moves from the lower stroke end toward the fluid chamber b to its upper stroke end, the volume of the fluid chamber b decreases by an amount at least equal to the amount of brake fluid supplied to the wheel brakes 21–24 from the pump 19 (or 20).

In this device, during T/C control (at which time the brake pedal is not depressed), the piston p is pulled by the pump 19 (or 20), so that brake fluid in the fluid chamber b is supplied to the pump 19 (or 20). While the fluid pressure is re-increasing during antilock control, brake fluid accumulated in the dumped fluid reservoirs while the pressure is decreasing during antilock control is drawn into the pumps 19 and 20. Thus, brake fluid is smoothly supplied to the pumps 19, 20 at all times. Since the shutoff valves 3, 4 serve as intermediate fluid reservoirs proposed in unexamined Japanese patent publication 5-116607, there is no need to provide separate intermediate reservoirs. It is thus possible to provide a smaller, less expensive fluid pressure control device.

Also, there is no need to provide valve means between the fluid chambers b as fluid supply chambers and the pumps 19, 20, so that the pumps can draw brake fluid without encountering any significant suction resistance.

Thus, the brake fluid pressure control device shown in FIG. 3, which the applicant of this invention proposed in unexamined Japanese patent publication 6-246400, has practically nothing to complain about as an ABS+T/C control device.

But this device can not satisfactorily carry out other types of automatic brake control such as for maintaining the stability of the running vehicle or for avoiding an rear-end collision.

Figure 4:
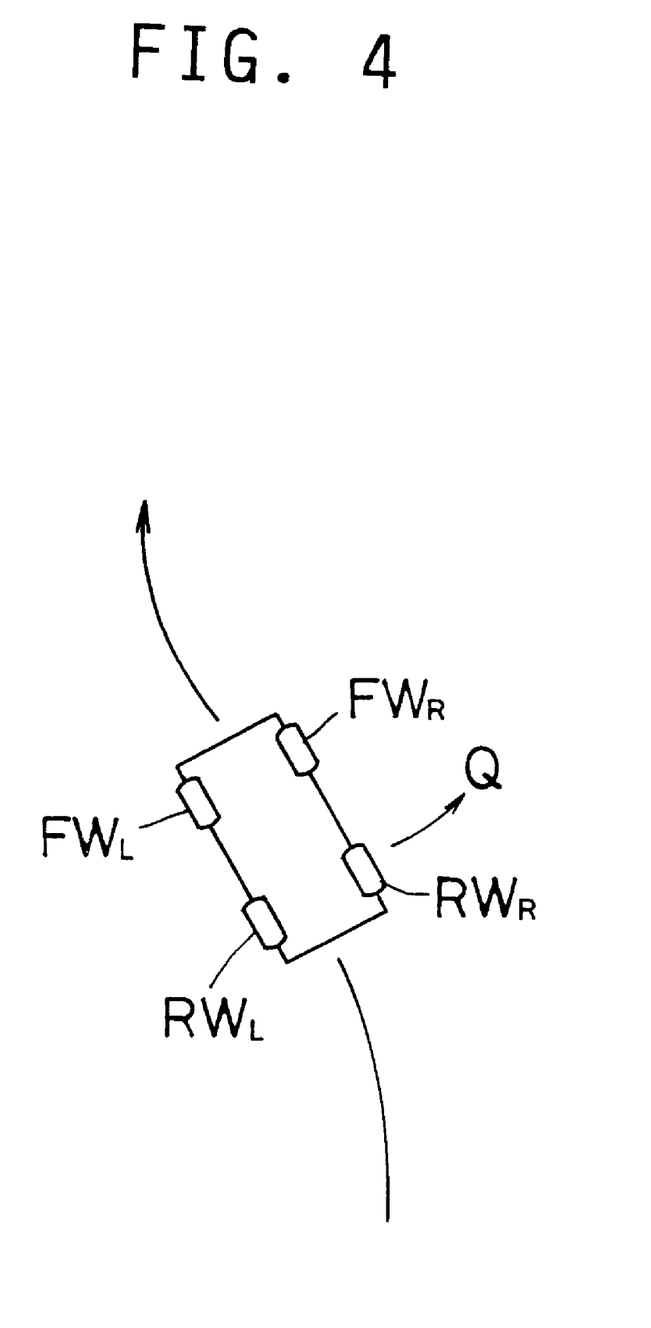
FIG. 4 is a view explaining how vehicle stability control of the vehicle is carried out.

For example, suppose the device shown in FIG. 3 has the vehicle stability control function. If the driver turns the steering wheel counterclockwise in an attempt to change lanes as shown in FIG. 4 while the vehicle is traveling at high speed, then centrifugal force will act on the vehicle which tends to skid the rear of the vehicle in the direction of the arrow Q. The brake fluid control device thus detects this force Q through e.g. an inertia sensor, and applies a braking force only to the front right wheel FWR to counteract the force Q. But if the brake pedal is being depressed to such an extent that no ABS control is initiated when the force Q is detected, the device of FIG. 3 cannot increase the brake pressure on the front right wheel (the wheel brake 22 in FIG. 3 corresponds to the front right wheel FWR in FIG. 4, 23 to FWL, 21 to RWR and 24 to RWL), because in this state, the piston p of the shutoff valve 4 is unable to move under the master cylinder pressure and thus the pump 19 cannot draw brake fluid necessary to increase the brake pressure on the wheel FWR from the fluid chamber b. That is, the pressure control device cannot perform vehicle vehicle stability control in this state.

It is also feasible to provide the device of FIG. 3 with an anti-collision means which measures the distance from a front obstacle (such as a car) and automatically applies the brakes if the above distance is dangerously small. Suppose the car equipped with this means moves dangerously close to an obstacle and the driver depresses the brake pedal in an attempt to avoid collision. If, in this state, the electronic control unit of the pressure control device judges that the braking force is still insufficient based on sensor information, the control unit will endeavor to automatically increase the braking force by activating the pumps. But in this state, the pistons of the shutoff valves 3, 4 will not move under the master cylinder pressure, so that no fluid can be supplied to the pumps 19, 20, and thus no automatic braking is possible.

An object of this invention is to provide a brake fluid pressure control device capable of performing not only ABS control and T/C control, but other automatic braking control operations such as vehicle stability control and anti-collision control.

SUMMARY OF THE INVENTION

According to this invention, the brake fluid pressure control device of FIG. 3, in which only the driving wheel brakes are connected to the master cylinder through the first changeover valves (1 and 2 in FIG. 3), is modified such that all the four wheel brakes are connected to the master cylinder through the first changeover valves.

Further, the following elements are added to the brake fluid pressure control device of FIG. 3: fluid lines bypassing the shutoff valves and connecting the portions of the main fluid lines between the first changeover valves and the master cylinder with inlet ports of the pumps, second changeover valves for opening and closing the fluid lines, check valves provided in lines connecting the dumped fluid reservoirs to the pumps to allow only the fluid flow from the dumped fluid reservoirs to the pumps, and monitoring means provided in at least one of the main fluid lines between the first changeover valve and the master cylinder. When the electronic control unit judges that it is necessary to increase brake pressure with the pumps at least while the brake pressure is being increased by the master cylinder, the electronic control unit opens the second changeover valves.

Some preferred arrangements according to the invention are shown below:

a) A brake fluid pressure control device further comprising choke means provided in fluid lines leading from the pumps to the main fluid lines, and bypass lines leading from the pumps to the first changeover valves while bypassing the choke means. Each of the first changeover valves is a two-position, three-port valve which closes, when turned off, fluid communication between the bypass lines and the wheel brakes while permitting fluid communication between the master cylinder and the wheel brakes, and closes, when turned on, fluid communication between the master cylinder and the wheel brakes while permitting fluid communication between the bypass lines and the wheel brakes.

b) A brake fluid pressure control device further comprising fluid supply increasing means provided in the bypass lines for increasing the fluid supply from the pumps, check valves provided in the bypass lines for permitting only fluid flow from the fluid supply increasing means toward the first changeover valves, relief valves provided in the bypass lines in parallel to the check valves and adapted to open if the pressure of fluid flowing from the first changeover valve toward the fluid supply increasing means exceeds a predetermined pressure, fluid lines branching from the main fluid lines and connecting with the bypass lines at points between the fluid supply increasing means and the check valves or relief valves, and pressure-responsive valves for opening the fluid lines when the main fluid lines are not pressurized and closing the main fluid lines when the fluid lines are pressurized.

c) A brake fluid pressure control device further comprising third changeover valves for shutting off the pumps from the bypass lines while permitting fluid communication between the pumps and the choke means, when not activated, and for shutting off the pumps from the choke means while permitting fluid communication between the bypass lines and the pumps, when activated, pressure accumulators mounted in the bypass lines at points between the third changeover valves and the first changeover valves, check valves that permit only fluid flow from the pressure accumulators toward the first changeover valves, and relief valves provided parallel to the check valves and adapted to open if the pressure of fluid flowing from the first changeover valves toward the pressure accumulator exceeds a predetermined pressure of the relief valve, which is higher than the pressure necessary to pressurize the wheel brakes. Pressure is accumulated in the pressure accumulator before pressure is increased sharply for automatic braking.

The main fluid lines herein used refer to the portions of the brake fluid lines though which brake fluid flows from the master cylinder toward the wheel brakes and from the wheel brakes toward the master cylinder. In the present invention, each main fluid lines branches to the wheel brakes at points between the first changeover valves and the wheel brakes.

The brake fluid pressure control device of FIG. 3, having both the functions as an ABS controller and a T/C controller, is high in performance, reliable, inexpensive and compact in size. The device of this invention is basically the same in structure as the device of FIG. 3 with only the second changeover valves, check valves and pressure sensor added thereto. Thus, the device of this invention is also simple in structure, small in size and inexpensive.

Functionally, when it becomes necessary to produce brake pressure additionally with the pumps while the master cylinder is producing brake pressure, the second changeover valves open to feed brake fluid from the master cylinder to the inlet ports of the pumps. Thus, it is possible to carry out vehicle stability control even while the brake pedal is being depressed. The second changeover valves can be opened even while the master cylinder is producing no pressure, if necessary.

If the driver treads brake pedal during the vehicle stability control or T/C control, it is impossible to supply the master cylinder pressure to the wheel brakes because the wheel brakes are cut off from the master cylinder by the first changeover valves. But since the master cylinder pressure monitoring means such as a pressure sensor can detect whether or not the master cylinder pressure is being produced, or whether or not the brake pedal is being depressed, and determine the required braking force, it is possible to return the control mode to ordinary braking while aborting T/C control, or to adjust the braking force as required by the driver by discharging fluid from the pumps while continuing the vehicle stability control.

Specific functions and advantages of the devices a), b) and c) are described below.

Other features and objects of the present invention will become apparent from the following description made with reference to the accompanying drawings, in which:

DETAILED DESCRIPTION OF THE PREFERRED EMBODIMENT

Figure 1:
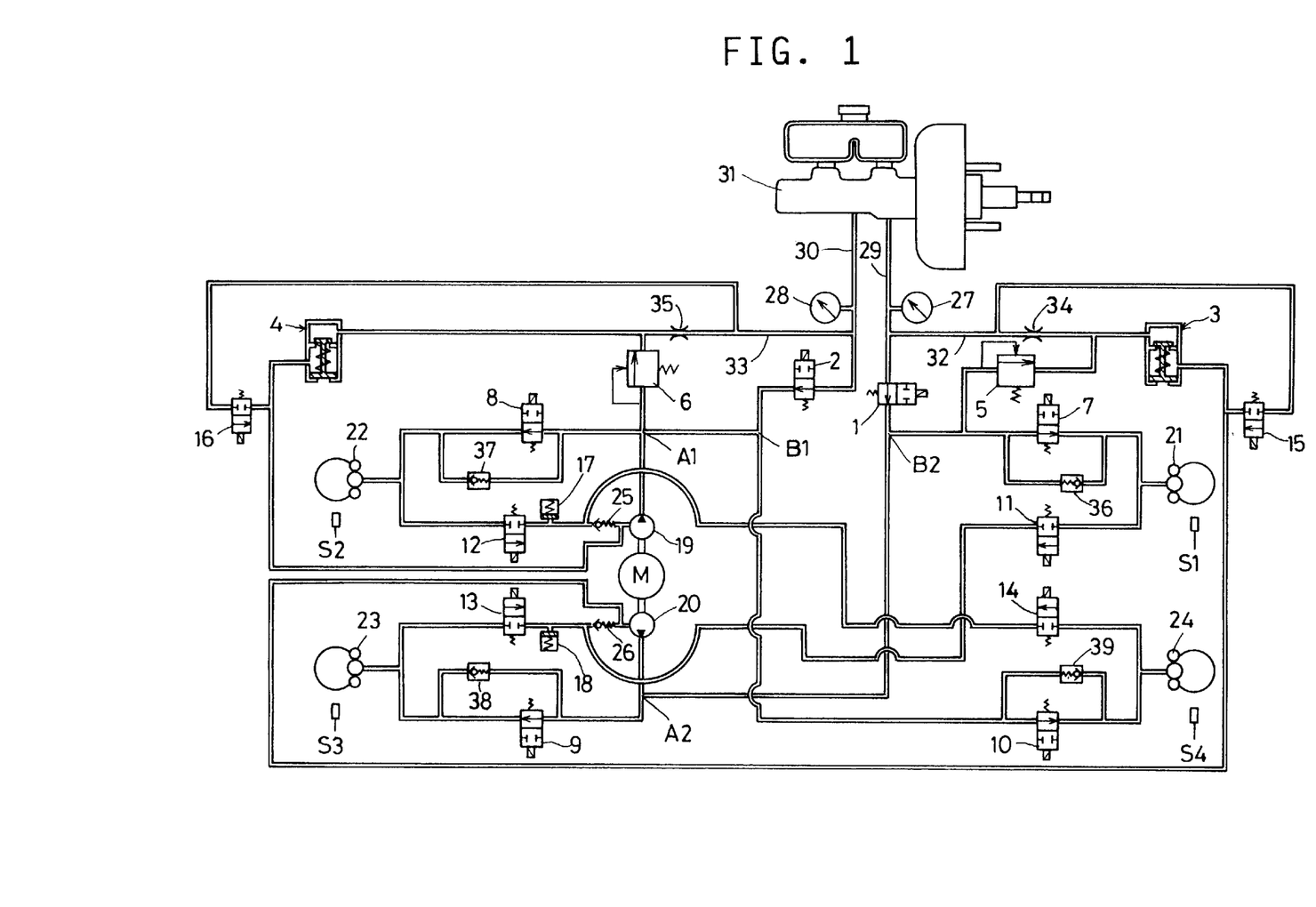
FIG. 1 is a circuit diagram of an embodiment of the brake fluid pressure control device according to the present invention.

FIG. 1 shows one embodiment of the brake fluid pressure control device of this invention. It comprises a tandem master cylinder 31; main fluid lines 29, 30 leading to wheel brakes 21, 23 and 22, 24, respectively; normally open first changeover valves 1, 2 provided in the respective main fluid lines; shutoff valves 3, 4 provided between the fluid supply line 32 and the dumped fluid reservoir 18 and between the supply line 33 and the dumped fluid reservoir 17, respectively; and relief valves 5, 6 for releasing excess fluid dumped from the pumps 19, 20 into the respective main fluid lines at points between the changeover valves 1, 2 and the master cylinder 31 when the valves 1, 2 are closed.

Numerals 7–10 indicate normally open on-off valves in the main fluid lines directly upstream of the respective wheel brakes. Each of the on-off valves 7–10 is paired with each of the on-off valves 11–14, which are in the lines between the wheel brakes and the dumped fluid reservoirs 17, 18, to serve as the brake fluid pressure control valve for each wheel brake.

The control device of FIG. 1 further includes normally closed second changeover valves 15, 16 provided in lines that bypass the shutoff valves 3 and 4, respectively; check valves 25, 26 provided in the line connecting the dumped fluid reservoirs 17, 18 to the pump 19, 20 to allow only the fluid flow from the dumped fluid reservoirs to the pumps; pressure sensors 27, 28 for detecting the pressure of fluid fed into the main fluid lines 29, 30 from the master cylinder; check valves 36–39 for checking fluid flow from the wheel brakes toward the master cylinder when the on-off valves 7–10 are closed; and wheel speed sensors S1–S4.

The brake fluid pressure control device of FIG. 1 differs from the device of FIG. 3 in that it further comprises the fluid lines that bypass the shutoff valves 3, 4, and the second changeover valves 15, 16 for opening and closing the bypass lines, and the check valves 25, 26, and that the first changeover valves 1, 2 are provided in the main fluid lines 29, 30 between the master cylinder and the points B1 and B2 where the main fluid lines branch toward the wheel brakes. Otherwise, the device of FIG. 1 is structurally the same as the device of FIG. 3.

Preferably, each shutoff valve 3 should be a type whose piston is biased toward the atmospheric chamber a by a biasing means (such as the spring s shown in FIG. 3) which does not hinder the movement of the piston under the negative pressure produced by the pump. Without such a biasing means, the piston p that has been moved under the negative pressure produced by the pump is moved back toward the atmospheric chamber to its stroke end solely under the master cylinder pressure. Thus, the brake pedal feelings will vary depending upon whether the pumps are activated or not when the pedal is depressed.

If such a biasing means is provided in the shutoff valves, it is preferable to provide bottlenecks 34 and 35 in the supply lines 32 and 33 and connect the outlets of the relief valves 5 and 6 to the supply lines at points between the bottlenecks and the shutoff valves 3, 4. The bottlenecks 34, 35 increase the fluid flow resistance to restrict the suction of fluid from the master cylinder by the pumps 19, 20 during T/C control. This lessens uncomfortable pedal feelings when the brake pedal is depressed during T/C control. Also, the pumps can suck and dump brake fluid more smoothly because the flow resistance by the bottlenecks serves to direct most of the excess fluid dumped from the pumps through the relief valves 5, 6 into the shutoff valves 3, 4.

The device of FIG. 1 has two pressure sensors for monitoring the master cylinder pressure. But one such sensor may be sufficient. Also, the master cylinder pressure monitoring means is not limited to pressure sensors. For example, a pedal depressing force sensor and a pedal stroke sensor can serve as the master cylinder pressure monitoring means because the master cylinder pressure is in proportional to the pedal depressing force or pedal stroke. It is also possible to use any other means which can directly or indirectly detect the master cylinder pressure.

Figure 2:
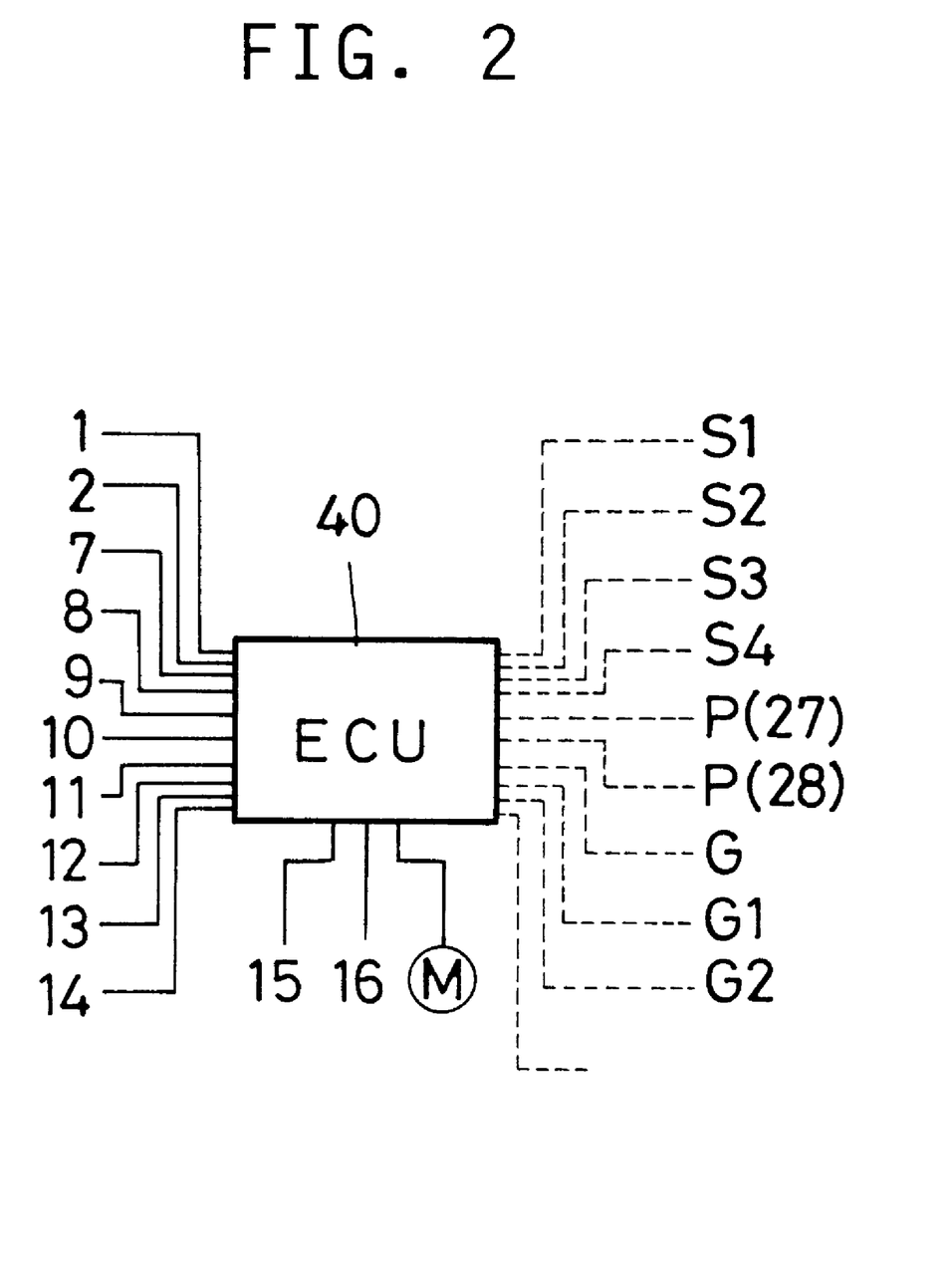
FIG. 2 is a schematic view of an electronic control unit of the device of FIG. 1.

The brake fluid pressure control device according to this invention has an electronic control unit 40 shown in FIG. 2. The electronic control unit 40 receives signals from wheel speed sensors S1–S4, pressure sensors 27, 28, a vehicle deceleration sensor G, inertia sensors G1 and G2 for detecting vehicle skid, a steering wheel turning angle sensor (not shown), and other sensors, and controls solenoid changeover valves 1, 2 and 7–16 and a pump driving motor M based on the signal information.

The operation of the device of FIG. 1 is now described.

During normal braking and ABS control, the changeover valves 1, 2 are open and the shutoff valves 3, 4 are closed by the force of the springs (s in FIG. 3). Even if the valves 3, 4 are left open, they are closed as soon as the master cylinder produces pressure to move the piston p. Thus, during normal braking and ABS control, this device operates exactly the same way as conventional ABS's.

Its operation will be explained for individual control modes.

ABS control

ABS control is carried out with the first changeover valves 1, 2 open and the valves 15, 16 closed. If the electronic control unit judges that a certain vehicle wheel is locking, it controls the on-off valve pair 7 and 11, 8 and 12, 9 and 13, or 10 and 14 corresponding to the locking wheel to repeatedly reduce, maintain and reincrease the brake fluid pressure. While the brake pressure is being reduced to avoid locking during ABS control, fluid from the master cylinder 31 flows into the dumped fluid reservoirs 17, 18. Thus, even though no fluid is supplied from the master cylinder directly to the pumps 19, 20 during ABS control because the shutoff valves 3, 4 are closed, the pumps 19, 20 can use the fluid stored in the reservoirs 17, 18 to reincrease the brake pressure.

T/C control

During T/C control, the electronic control unit closes the first changeover valves 1, 2. The pumps 19, 20 suck up fluid in the fluid chamber of the shutoff valves 3, 4 and feed it to the brake of any spinning wheel to increase the brake pressure of this wheel brake. If, in this state, the wheels corresponding to the wheel brakes 21, 24 are not spinning, the electronic control unit closes the on-off valves 7 and 10 and opens the on-off valves 11 and 14 as discharge valves so as not to apply brake pressure on the wheel brakes 21, 24. Since the brake pedal is not depressed during T/C control, the upper limit of the pressure applied to the wheel brakes is determined by the set pressure of the relief valves 5, 6. That is, if the actual brake pressure exceeds the set pressure, the relief valves release fluid dumped from the pumps into the lines leading to the shutoff valves, thereby preventing excessive pressure in the circuit.

T/C control is mainly carried out when the vehicle begins moving, i.e. when the vehicle speed is low. Thus, if the pressure sensors 27, 28 detect that the brake pedal has been depressed during T/C control with the vehicle speed below a predetermined level, T/C control is aborted. Brakes are thus applied in a normal manner.

Stability control of vehicle

If the driver loses control stability of the vehicle when he turns a steering wheel without applying brakes in order to e.g. change lanes, the electronic control unit applies the brakes to a necessary wheel or wheels to correct the vehicle attitude.

More specifically, the electronic control unit receives signals from inertia sensors and other sensors. If the vehicle stability is lost, the electronic control unit judges instantly which one or ones of the wheels should be braked based on the sensor information to apply the brakes to the necessary wheel or wheels. During vehicle stability control, the brakes are controlled in basically the same manner as during T/C control.

However, if the driver depresses the brake pedal during vehicle stability control, it is very dangerous to stop the vehicle stability control abruptly to get back to normal braking mode after detecting that the brake pedal has been depressed, because in such a case, the vehicle is most probably traveling at a fairly high speed, so that the vehicle tends to lose stability again as soon as the vehicle stability control is stopped.

To solve this problem, during vehicle stability control, the first changeover valves 1, 2 are kept closed. If the brake pedal is depressed in this state, the electronic control unit produces brake pressure corresponding to the master cylinder pressure as measured by the pressure sensors 27, 28. For example, if the brake pedal is depressed with only the wheel brake 22 being pressurized during vehicle stability control, the electronic control unit controls the on-off valves 7–10 and 11–14 to apply at the same rate brake pressure corresponding to the master cylinder pressure to all the four wheel brakes until the fluid pressure in the wheel brakes 21, 23 and 24 becomes equal to the master cylinder pressure. In this state, the braking pressure in the wheel brake 22 is greater than the braking pressure in the remaining three wheel brakes because the wheel brake 22 has been pressurized before the brake pedal is depressed. Thus, it is possible to continue vehicle stability control while applying braking pressure corresponding to the intention of the driver.

If the vehicle stability is lost while the brake pedal is being depressed to such an extent that no ABS control is started, the electronic control unit opens the second changeover valves 15, 16 so that the pumps 19, 20 can feed fluid from the master cylinder 31 into a necessary wheel brake or brakes to further increase their brake pressure.

In this state, the check valves 25, 26 prevent fluid supplied from the master cylinder 31 through the second changeover valves 15, 16 from flowing into the dumped fluid reservoirs 17, 18. Thus, it is possible to reduce the wheel brake pressure electronic control whenever necessary by discharging fluid in the wheel brakes through the on-off valves 11–14 into the empty dumped fluid reservoir 17, 18.

If vehicle stability control begins while the brake pedal is being depressed, the first changeover valves 1, 2 are closed. Thereafter, the pumps will apply brake pressure corresponding to the master cylinder pressure to the selected wheel brakes. It is thus possible to carry out vehicle stability control while applying brake pressure corresponding to the master cylinder pressure to the wheel brakes, in exactly the same way as when the brake pedal is depressed during vehicle stability control.

Any excess fluid dumped from the pumps flows through the relief valves 5, 6 and the second changeover valves 15, 16 back to the pumps. Thus, only a small amount of brake fluid is supplied from the master cylinder 31 to the pumps 19, 20, so that the master cylinder pressure drops little and the pedal stroke is kept small. Also, it is possible to supply fluid from the master cylinder to the pumps while the brake pedal is being depressed without encountering any safety problem.

If fluid is dumped from a given wheel brake into the corresponding dumped fluid reservoir 17 or 18 to reduce the brake pressure on this wheel brake during vehicle stability control, the corresponding second changeover valve 15 or 16 is temporarily closed to empty the dumped fluid reservoir 17 or 18 so that fluid dumped from the wheel brake next time for pressure reduction can flow into this reservoir.

If vehicle stability control begins while the brakes are being applied with ABS control on, the electronic control unit will open the first changeover valves 1, 2 and closes the second changeover valves 15, 16, if the brake pressure is sufficient, and controls the pressure of fluid supplied from the master-cylinder to the wheel brakes by selectively opening and closing the on-off valves 7–10 and 11–14.

If the brake pressure is insufficient, the electronic control unit will close the first changeover valves 1, 2 and opens the second changeover valves 15 to perform vehicle stability control by supplying fluid pressure produced by the pumps to necessary wheel brakes.

Anti-collision control

This control is also basically the same as T/C control. If the electronic control unit judges that automatic braking is needed based on the signal from the distance sensor, it actuates the pumps 19, 20 with the first changeover valves 1, 2 closed to increase the brake pressure by supplying fluid in the fluid chambers of the shutoff valves 3, 4 to the wheel brakes.

If the brake pedal has already been depressed just before anti-collision control begins, it is impossible to supply fluid in the shutoff valves 3, 4. Thus, in this case, the electronic control unit closes the first changeover valves 1, 2 and opens the second changeover valves 15, 16 to increase brake pressure with the pumps. In this case, the master cylinder pressure cannot supply sufficient brake pressure. Therefore automatic braking mode sets in to replenish braking pressure with the pumps.

If the brake pedal is depressed during T/C control or vehicle stability control, fluid in the shutoff valves has already been used by the pumps. Thus the second changeover valves 15, 16 may be kept closed in this state.

Figure 5:
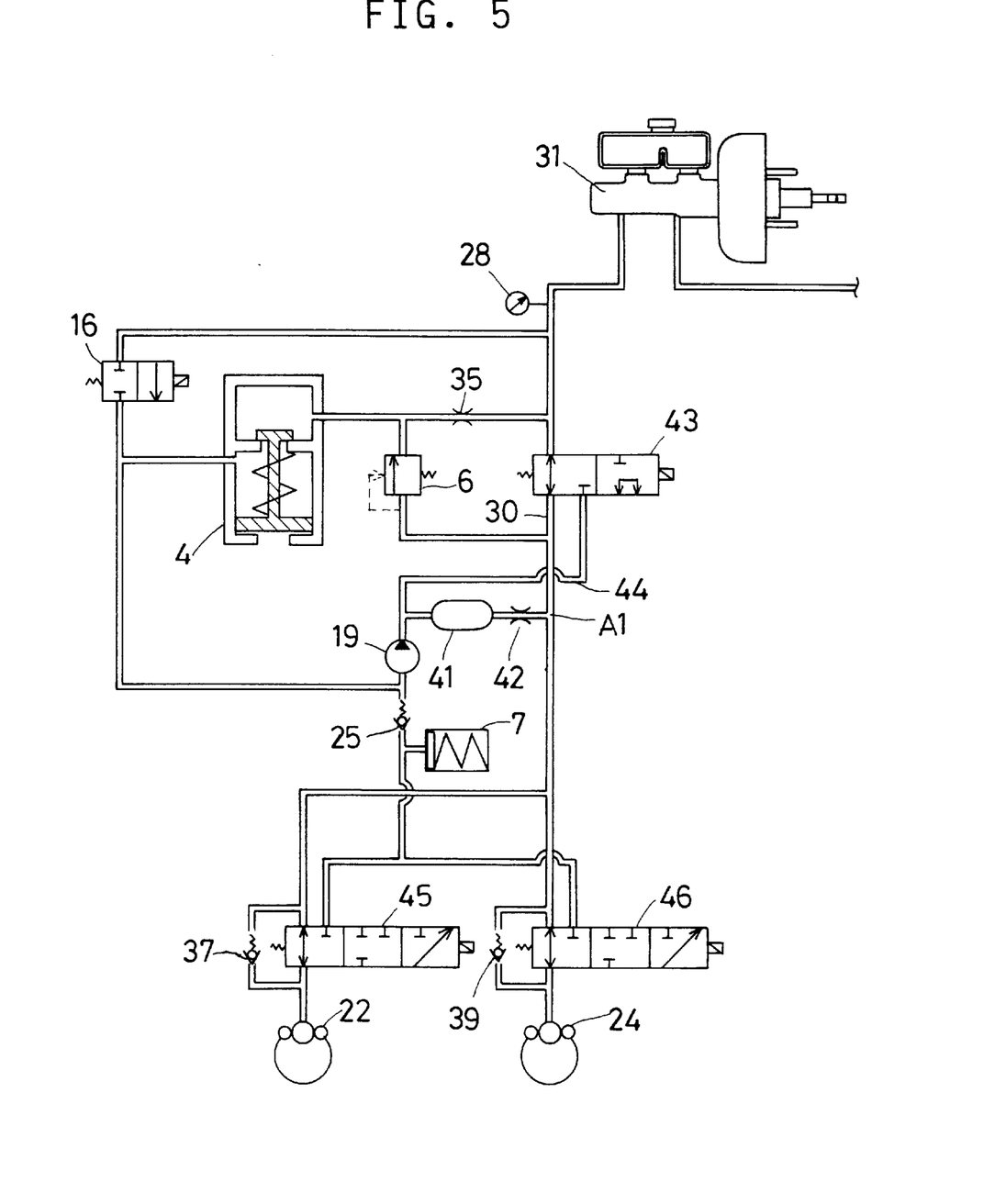
FIG. 5 is a circuit diagram of a brake fluid pressure control device of a second embodiment.
Figure 6:
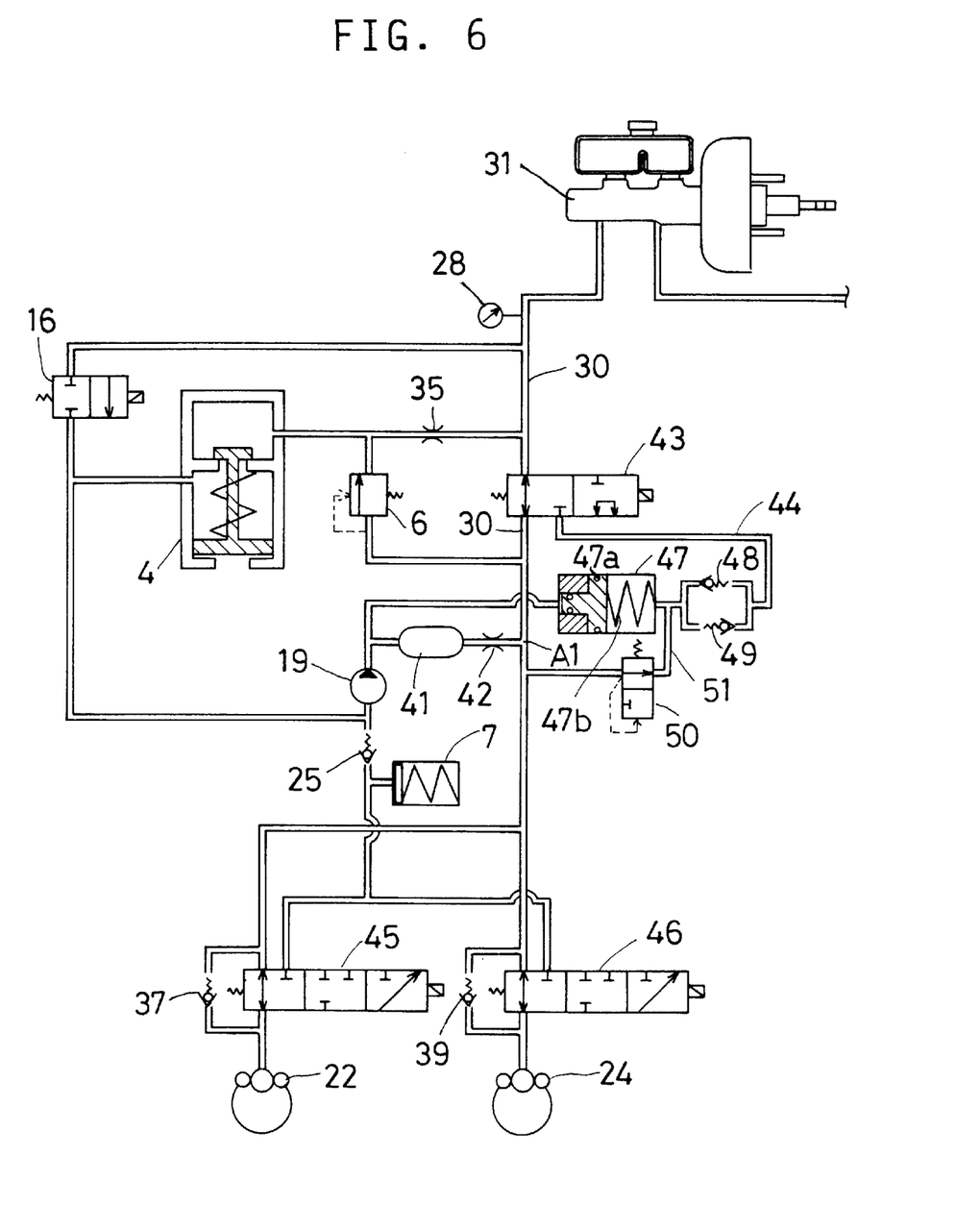
FIG. 6 is a circuit diagram of a brake fluid pressure control device of a third embodiment.
Figure 7:
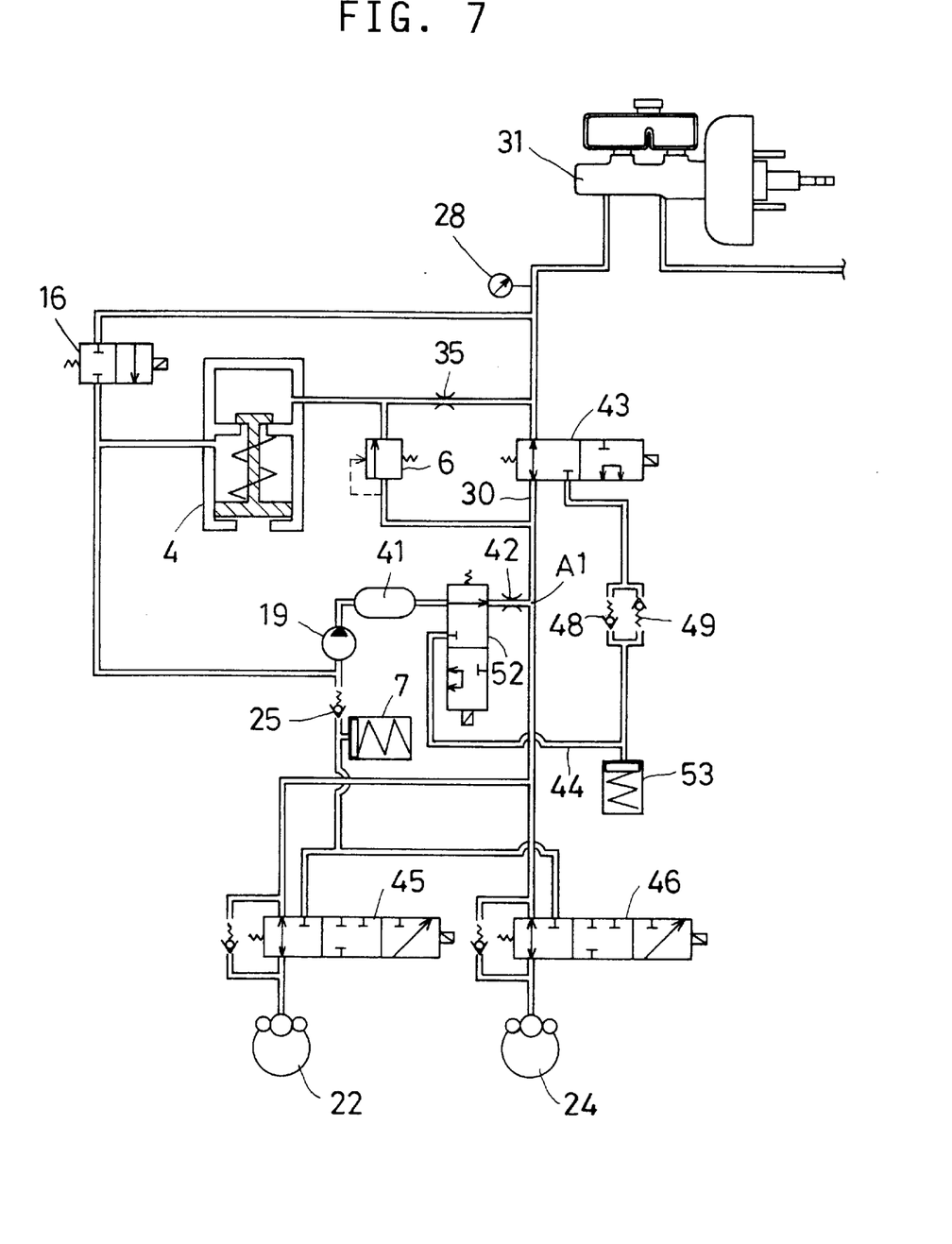
FIG. 7 is a circuit diagram of a brake fluid pressure control device of a fourth embodiment.

Preferred embodiments of the brake fluid pressure control device of this invention are shown in FIGS. 5–7.

Specific embodiments of the brake fluid pressure control device of this invention are shown in FIGS. 5–7.

Each of these embodiments comprises two identical brake circuits connected to a tandem master cylinder 31. In FIGS. 5–7, one of the two brake circuits is omitted.

The brake lines are arranged in what is called X configuration, so that the wheel brakes 22 and 24 belong to the same brake circuit.

This type of brake fluid pressure control device has its pump driven by a motor, so that brake fluid flowing through the main fluid line 30 will pulsate while the pump is activated. Such pulsation will vibrate the brake piping and other parts connected to the piping, thus producing noise. In order to minimize such detrimental pulsation, it is an ordinary practice to provide a pulsation damping chamber 41 and a bottleneck 42 in the line connecting the pump 19 to the brake fluid return point A1.

But if a bottleneck 42 is provided in the brake circuit shown in FIG. 1, such a bottleneck will slow down the pressure increase speed during T/C control, the stability control and anti-collision control. Especially if the pressure is increased solely by the pump, this is true because brake fluid dumped from the pump to the wheel brakes 22, 24 has to pass through the bottleneck 42.

Highest safety is the name of the game for a brake fluid pressure control device. Quick response is the key factor for safety. But in order to increase the commercial value of such a device, it is also important to minimize pulsation of brake fluid flow.

The brake fluid pressure control devices of FIGS. 5–7 meet both these requirements.

In the device of FIG. 5, the first changeover valve is a two-position, three-port changeover valve 43. To reduce pulsation, a pulsation damping chamber 41 and a bottleneck 42 are provided in a line leading from the pump 19 to the fluid return point A1 of the main fluid line. A bypass 44 extends from the pump 19 to the first changeover valve 43 to bypass the bottleneck 42. This is what this embodiment differs from the device of FIG. 1.

Three-position, three-port changeover valves 45, 46 are used to control fluid pressure in the wheel brakes 22, 24, because a single such valve can increase, hold and reduce pressure all alone. But instead, two separate on-off valves 8, 11 and 10, 14 may be provided for each wheel brake as in the embodiment of FIG. 1. These valves are functionally nothing different from the valves 45, 46. Otherwise, this device is structurally the same as the device of FIG. 1. Thus, identical elements are denoted by identical numerals and their description is omitted.

When turned off, the first changeover valve 43 opens the main fluid line, which connects the master cylinder 31 to the wheel brakes 22, 24, while shutting off the bypass 44 from the wheel brakes 22, 24. When turned on, the first changeover valve 43 closes the main fluid line and opens the bypass 44.

In this arrangement, during the pressure reincrease phase in ABS control, brake fluid from the pump 19 flows through the bottleneck 42 to the wheel brakes 22, 23. Pulsation is thus suppressed by the bottleneck. During T/C control, vehicle stability control or anti-collision control, in which the first valve 43 is on, fluid dumped from the pump 19 flows smoothly through the bypass 44 to the wheel brakes 22, 24. The pressure in the brakes thus increases quickly.

The brake fluid pressure control device shown in FIG. 6 is designed so that pressure can be increased more quickly during automatic braking mode. This device is basically the same as the device of FIG. 5, but further comprises a fluid supply increasing means 47, a check valve 48, a relief valve 49 and a pressure-responsive valve 50.

The fluid supply increasing means 47 comprises a stepped piston 47a for increasing the fluid supply at a rate determined by the surface area ratio between the pressure-bearing surfaces at both ends of the piston 47a. The piston 47a is mounted in the bypass 44 so that the brake fluid pressure from the pump 19 acts on its small-diameter end.

The check valve 48 and the relief valve 49 are mounted parallel to each other in the bypass 44 at a location nearer to the first changeover valve 43 than is the fluid supply increasing means 47. The pressure-responsive valve 50 is mounted in a line 51 branching from the main fluid line 30 (at a point not limited to the illustrated branch point) and connecting with the bypass 44 at a point nearer to the fluid supply increasing means 47 than are the check valve 48 and the relief vale 49.

During the pressure re-increasing phase in ABS control, the device of FIG. 6 operates in the same way as the device of FIG. 5, so that pulsation is suppressed effectively.

During T/C control, in which the first changeover valve 43 is on, the fluid supply increasing means 47 increases the fluid supply from the pump 19. The increased amount of fluid flows through the check valve 48 and the first changeover valve 43 into the wheel brakes 22, 24, thus quickly increasing the brake pressure.

The stepped piston 47a stops when the difference between the fluid pressures acting on the small-diameter end and the large-diameter end of the piston balances with the difference between the fluid pressures at both ends of the bottleneck 42. Thereafter, brake fluid from the pump 19 flows through the bottleneck 42 to the wheel brakes 22, 24. Since the amount of fluid necessary to increase the pressure by a unit amount decreases as the brake fluid pressure increases, pressure can increase quickly even after fluid has begun to flow through the bottleneck 42.

If the fluid pressure in the main fluid line at its portion between the first changeover valve 43 and the wheel brakes (hereinafter simply referred to as wheel brake side of the main fluid line) exceeds a predetermined level after brake fluid begins to flow through the bottleneck 42, the relief valve 49 opens. Excess brake fluid thus flows into the large-area chamber of the fluid supply increasing means 47, pushing the piston 47b back to the illustrated original position. If the fluid pressure in the wheel brake side of the main fluid line further increases to the set pressure of the relief valve 6, the relief valve opens to protect the circuit.

The pressure-responsive valve 50 is kept open while the main fluid line 30 is not pressurized. If the stepped piston 47a has not fully returned during automatic braking control, the fluid line 51 acts as a fluid supply line for supplying fluid to return the piston. (At this time, the piston is returned by the piston 47b.) When the main fluid line 30 is pressurized, the pressure-responsive piston 50 closes to prevent braking fluid from being used to return the stepped piston 47a during the normal braking mode.

The brake fluid pressure control device shown in FIG. 7 can also increase the pressure increase speed above the discharge capacity of the pump 19.

The device of FIG. 7 has a third changeover valve 52 provided between the pulsation damping chamber 41 and the bottleneck 42. When not activated, the third changeover valve 52 opens the line connecting the pump 19 to the bottleneck 42 while closing the bypass 44. When off, it closes the line between the pump 19 and the bottleneck 42 and opens the bypass 44.

A pressure accumulator 53 is provided in the bypass 44 between the third changeover valve 52 and the first changeover valve 43. Further in the bypass 44, a check valve 48 and a relief valve 49 are provided parallel to each other between the accumulator 53 and the first changeover valve 43. Otherwise, this device is substantially the same in structure as the device of FIG. 5. But precisely, these devices differ in the position of the branch point of the bypass 44 near the pump. But since the pulsation damping chamber 41 has no influence on the pressure increase speed, it will pose no practical problem to position the branch point of the bypass 44 as shown in FIG. 7.

The set pressure of the relief valve 49 is set to be higher than the upper limit of the brake fluid pressure necessary to increase the wheel brake pressure (about 100 bar).

With this arrangement, the relief valve 49 is kept closed even if the bypass 44 is brought into communication with the pump 19 through the first changeover valve 43 unless the fluid supply is excessive. As long as the relief valve 49 is closed, fluid dumped from the pump cannot flow into the accumulator 53. It is thus possible to maintain high pressure increase performance.

In situations where quick pressure increase is needed, such as for vehicle stability control, in the device of FIG. 7, pressure is accumulated in the accumulator 53 before the need to increase wheel brake pressure arises by turning on the third changeover valve 52 to guide the fluid dumped from the pump 19 into the accumulator 53.

Such pressure accumulation may be started when the ignition switch is turned on, when the electronic control unit judges that there is an imminent need for vehicle stability control, and so on. At this time, the master cylinder 31 communicates with the wheel brakes 22, 24 through the first changeover valve 43. Thus there is little restriction to the timing at which pressure accumulation is started.

When there arises a need for quick pressure increase for vehicle stability control after enough pressure has been accumulated, the first changeover valve 43 is turned on to connect the bypass 44 with the wheel brake side of the main fluid line. Brake fluid in the accumulator 53 will be dumped toward the wheel brakes 22, 24. At the same time, the pump 19 is activated with the third changeover valve 52 turned off to supply brake fluid dumped from the pump 19 to the wheel brakes through the bottleneck 42. Thus, it is possible to increase the brake pressure at a rate higher than the rate determined by the capacity of the pump.

The check valve 48 of the device of FIG. 7 prevents the fluid dumped from the accumulator 53 from flowing back into the accumulator if the fluid pressure in the wheel brake side of the main fluid line exceeds the pressure of the fluid dumped from the accumulator 53 due to the fluid pressure produced by the pump 19.

When the fluid supply to the wheel brakes becomes excessive, the relief valve 49 opens before does the relief valve 6 to return excess fluid into the accumulator 53.

It is economically undesiarable to provide a relief valve for controlling pressure during pressure accumulation separately from the first changeover valve 43. Thus, as the first changeover valve, it is preferable to use one having the function as a relief valve.

Figure 8:
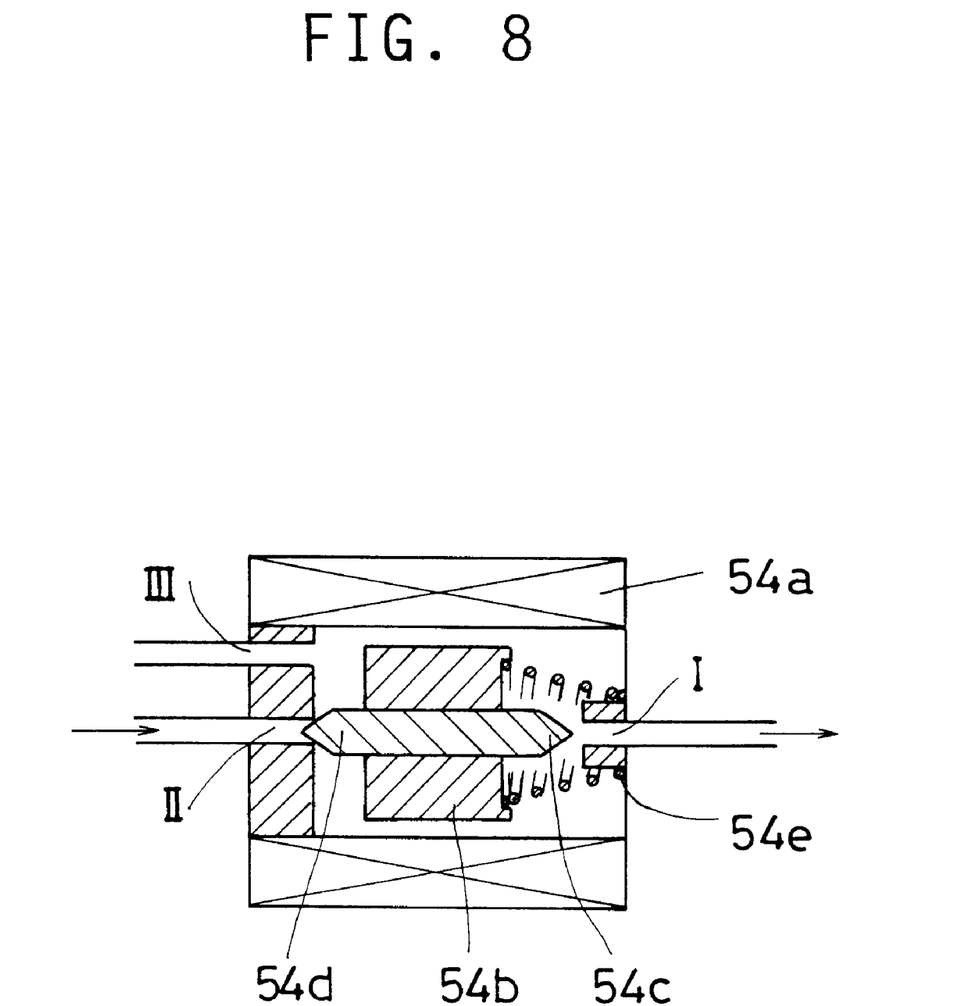
FIG. 8 is a sectional view of a two-position, three-port changeover valve.

FIG. 8 shows an example of such a changeover valve. This changeover valve 54 comprises a coil 54a, a movable core 54b, a spring 54e biasing the core 54b and a valve body 54d. When the coil 54a is not energized, the core 54b is biased by the spring 54e to its stroke end. In this state, port II is closed by the valve body 54d with ports I and III communicating with each other. When the coil 54a is energized, the core 54b is magnetically pulled rightwardly in the figure until the port I is closed by the valve body 54c and the port II opens and communicates with the port III.

This changeover valve 54 is used as the first valve in the device of FIG. 7 with the port I connected to the line leading to the master cylinder 31, the port III to the line leading to the wheel brakes, and the port II to the bypass 44. In this arrangement, the upper limit of the pressure accumulated in the accumulator 53 is determined by the force of the spring 54e. If the pressure of the accumulated pressure exceeds this limit, the spring 54e is compressed, releasing any excess pressure in the bypass.

The changeover valve 54 shown in FIG. 8 may be used as the first changeover valve 43 in the device of FIG. 6 or as the third changeover valve 52 in the device of FIG. 7.

As described above, if the electronic control unit judges that it is necessary to increase brake pressure with the pumps while the driver is treading the brake pedal, it opens the second changeover valves. In this state, brake fluid is supplied to the pumps from the master cylinder. The brake fluid pressure control device of this invention can thus carry out not only ABS control and traction control but vehicle stability control and anti-collision control. The entire device is simple in structure, small in size and inexpensive.

In the arrangement in which the throttle means are provided in the lines leading from the pumps to the main fluid lines, and in which the first changeover valves open the bypass lines provided parallel to the lines having the throttle means when turned on, it is possible to suppress pulsation during ABS control and to increase brake pressure quickly while the first valve is turned on. By providing fluid supply increasing means and pressure accumulators in the bypass passages, it is possible to increase brake pressure at a rate greater than the rate determined by the capacity of the pumps.

What is claimed is:

1. A brake fluid pressure control device comprising a master cylinder, main fluid lines extending from said master cylinder to wheel brakes, on-off valves provided in said respective main fluid lines immediately upstream of the wheel brakes, dumped fluid reservoirs for temporarily storing brake fluid dumped from said wheel brakes, on-off valves provided in lines connecting from said wheel brakes to said dumped fluid reservoirs, pumps for drawing and returning fluid in said dumped fluid reservoirs into said main fluid lines, fluid supply lines branching from said respective main fluid lines at points between said master cylinder and fluid return points at which fluid dumped from said pumps is returned to said main fluid lines and between said master cylinder and points at which said main fluid lines branch into a plurality of lines leading to the respective wheel brakes, said fluid supply lines leading to the respective dumped fluid reservoirs, first changeover valves provided in said respective main fluid lines between the branch points at which said fluid supply lines branch from said main fluid lines and said wheel brakes and between said fluid return points and said master cylinder, relief valves for releasing any excess brake fluid dumped from said pumps into portions of said main fluid lines between said first changeover valves and said master cylinder when said first changeover valves are closed, shutoff valves for checking fluid flow through said fluid supply lines to said dumped fluid reservoirs when said master cylinder is pressurized, and an electronic control unit for controlling said on-off valves, said pumps and said first changeover valves,

- each of said shutoff valves comprising an atmospheric chamber, a fluid chamber communicating with said respective dumped fluid chamber, a piston partitioning said atmospheric chamber and said fluid chamber, and a valve body movable together with said piston for shutting off said respective fluid supply line from said dumped fluid reservoir when said piston moves toward said atmospheric chamber to a first stroke end and otherwise permitting fluid communication between said respective fluid supply line and said dumped fluid reservoir, whereby when said piston moves from said first stroke end toward said fluid chamber to a second stroke end, the volume of said fluid chamber changes by an amount corresponding to the amount of brake fluid supplied into said wheel brakes from said respective pump, wherein:
- all of said wheel brakes are connected to said master cylinder through said first changeover valves,
- said brake fluid pressure control device further comprising bypass fluid lines bypassing said shutoff valves and connecting the portions of said main fluid lines between said first changeover valves and said master cylinder with inlet ports of said pumps, second changeover valves provided in said bypass fluid lines for opening and closing said bypass fluid lines, check valves provided in lines connecting said dumped fluid reservoirs to said pumps to allow only the fluid flow from said dumped fluid reservoirs to said pumps, and monitoring means provided in at least one of said main fluid lines between said first changeover valves and said master cylinder,
- wherein when said electronic control unit judges that it is necessary to increase brake pressure with said pumps at least while the brake pressure is being increased by said master cylinder, said electronic control unit opens said second changeover valves.

2. A brake fluid pressure control device as claimed in claim 1 further comprising choke means provided in fluid lines leading from said pumps to said main fluid lines, and bypass lines leading from said pumps to said first changeover valves while bypassing said choke means, each of said first changeover valves being a two-position, three-port valve which closes, when turned off, fluid communication between said bypass lines and said wheel brakes while permitting fluid communication between said master cylinder and said wheel brakes, and closes, when turned on, fluid communication between said master cylinder and said wheel brakes while permitting fluid communication between said bypass lines and said wheel brakes.

3. A brake fluid pressure control device as claimed in claim 2 further comprising fluid supply increasing means provided in said bypass lines for increasing the fluid supply from said pumps, check valves provided in said bypass lines for permitting only fluid flow from said fluid supply increasing means toward said first changeover valves, relief valves provided in said bypass lines in parallel to said check valves and adapted to open if the pressure of fluid flowing from said first changeover valve toward said fluid supply increasing means exceeds a predetermined pressure, fluid lines branching from said main fluid lines and connecting with said bypass lines at points between said fluid supply increasing means and said check valves or relief valves, and pressure-responsive valves for opening said fluid lines when said main fluid lines are not pressurized and closing said fluid lines when said main fluid lines are pressurized.

4. A brake fluid pressure control device as claimed in claim 2 further comprising third changeover valves for shutting off said pumps from said bypass lines while permitting fluid communication between said pumps and said choke means, when not activated, and for shutting off said pumps from said choke means while permitting fluid communication between said bypass lines and said pumps, when activated, brake fluid pressure accumulators mounted in said bypass lines at points between said third changeover valves and said first changeover valves, check valves that permit only fluid flow from said pressure accumulators toward said first changeover valves, and relief valves provided parallel to said check valves and adapted to open if the pressure of fluid flowing from said first changeover valves toward said pressure accumulator exceeds a predetermined pressure of said relief valve, which is higher than the pressure necessary to pressurize said wheel brakes, wherein pressure is accumulated in said pressure accumulator before pressure is increased sharply for automatic braking.

* * * * *